US011613297B2

(12) United States Patent
Buzzard et al.

(10) Patent No.: US 11,613,297 B2
(45) Date of Patent: Mar. 28, 2023

(54) TELESCOPIC UNLOCKING MECHANISM

(71) Applicant: Steering Solutions IP Holding Corporation, Saginaw, MI (US)

(72) Inventors: Donald A. Buzzard, Saginaw, MI (US); Michael P. Anspaugh, Bay City, MI (US); Floyd E. Eschenbacher, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/665,073

(22) Filed: Feb. 4, 2022

(65) Prior Publication Data

US 2022/0266890 A1 Aug. 25, 2022

Related U.S. Application Data

(60) Provisional application No. 63/153,501, filed on Feb. 25, 2021.

(51) Int. Cl.
*B62D 1/184* (2006.01)
*B62D 1/19* (2006.01)

(52) U.S. Cl.
CPC ............ *B62D 1/184* (2013.01); *B62D 1/195* (2013.01)

(58) Field of Classification Search
CPC ........... B62D 1/184; B62D 1/195; B62D 1/19
See application file for complete search history.

(56) References Cited

U.S. PATENT DOCUMENTS

| 5,078,022 A * | 1/1992 | Ichikawa | B62D 1/184 |
| | | | 74/540 |
| 9,393,986 B1 * | 7/2016 | Anspaugh | B62D 1/184 |
| 9,764,757 B2 * | 9/2017 | Buzzard | B62D 1/184 |
| 2014/0116185 A1 * | 5/2014 | Tinnin | B62D 1/184 |
| | | | 74/493 |

(Continued)

FOREIGN PATENT DOCUMENTS

| EP | 1445168 A1 | 8/2004 | |
| GB | 2240383 A * | 7/1991 | ............. B62D 1/184 |

(Continued)

OTHER PUBLICATIONS

Office Action regarding corresponding DE App. No. 10 2022 104 430.0; dated Jan. 5, 2023.

*Primary Examiner* — Drew J Brown
(74) *Attorney, Agent, or Firm* — Dickinson Wright PLLC

(57) ABSTRACT

A locking mechanism for an axially adjustable steering column includes a lock cam including a cam portion and a hub portion, wherein the cam portion and the hub portion are independent, separately formed components. The locking mechanism also includes a pin extending through the cam portion to permit the cam portion to pivot. The locking mechanism further includes a toothed portion formed on the cam portion for pivoting into engagement with teeth associated with the axially adjustable steering column in a locked position and out of engagement with the teeth in an unlocked position. The locking mechanism yet further includes an interface surface on the hub portion that includes at least one angled surface that interfaces with an adjustable lever and biases the cam portion from the locked position to the unlocked position.

19 Claims, 11 Drawing Sheets

(56) References Cited

U.S. PATENT DOCUMENTS

| | | | | |
|---|---|---|---|---|
| 2014/0260763 A1* | 9/2014 | Buzzard | ................. | B62D 1/195 |
| | | | | 74/493 |
| 2015/0090068 A1* | 4/2015 | Anspaugh | .............. | B62D 1/184 |
| | | | | 74/526 |
| 2016/0144883 A1* | 5/2016 | Vermeersch | ........... | B62D 1/184 |
| | | | | 74/495 |
| 2018/0362069 A1* | 12/2018 | Sugiura | ................. | B62D 1/184 |

FOREIGN PATENT DOCUMENTS

| | | | | |
|---|---|---|---|---|
| JP | 59179452 A | * | 10/1984 | |
| KR | 102196925 B1 | * | 12/2020 | |
| WO | WO-2012011425 A1 | * | 1/2012 | ............ B62D 1/184 |
| WO | 2015056538 A1 | | 4/2015 | |

* cited by examiner

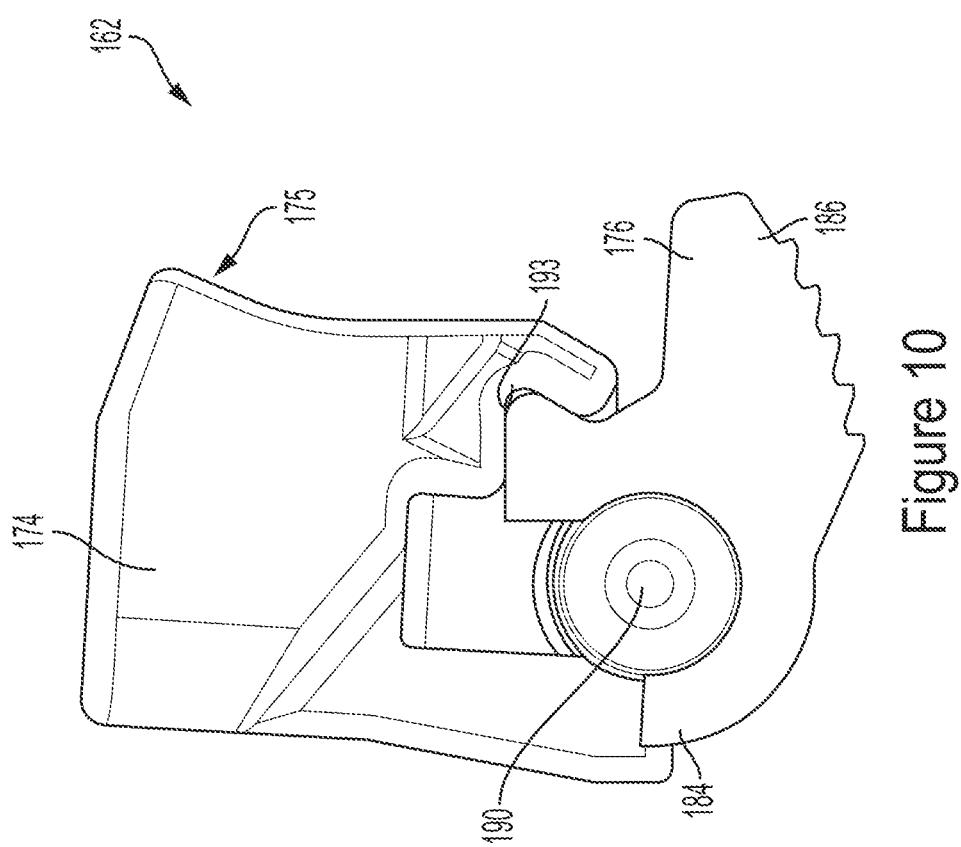

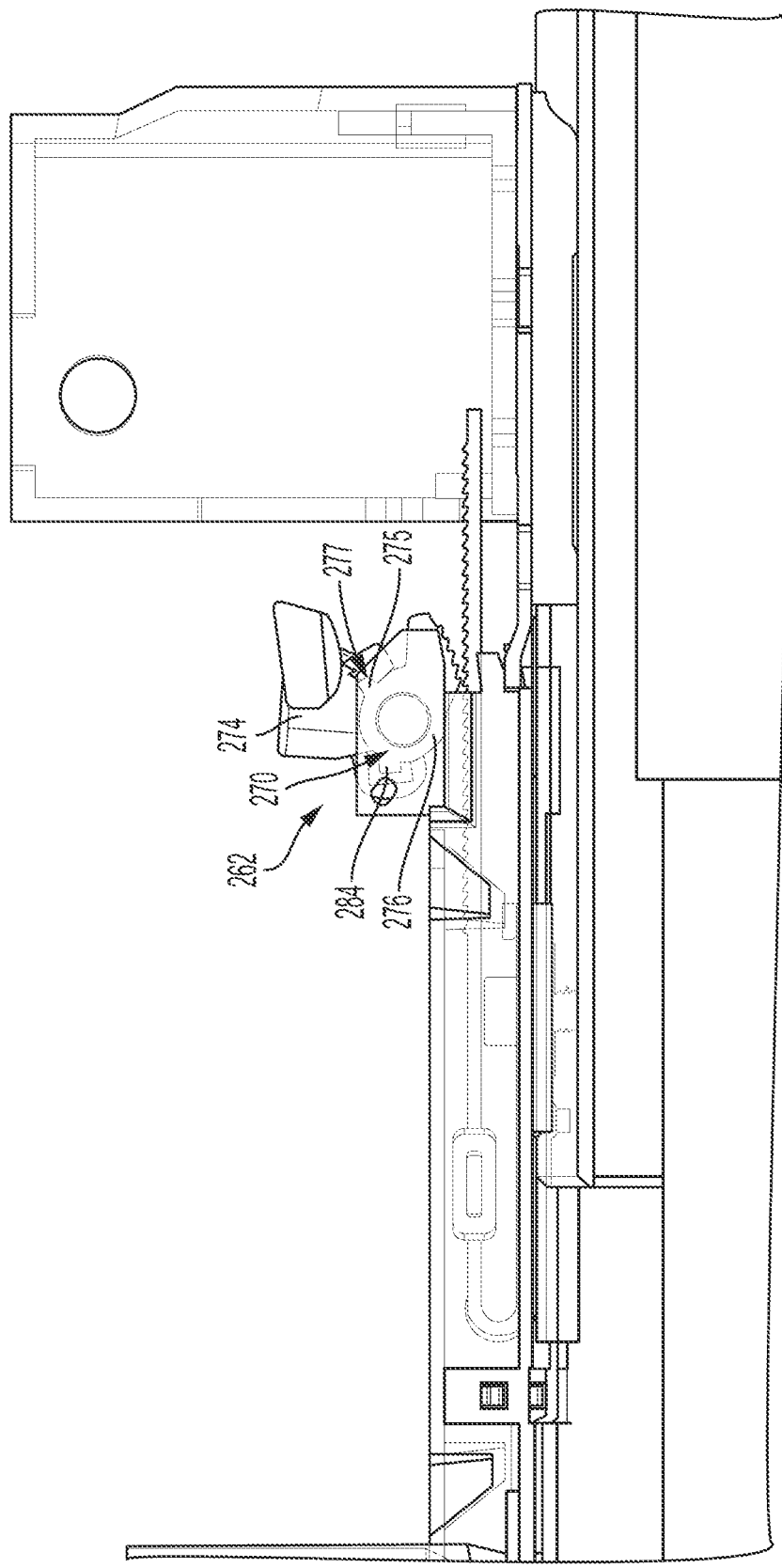

TELESCOPIC UNLOCKING MECHANISM

CROSS-REFERENCE TO RELATED APPLICATION

This patent application claims priority to U.S. Provisional Patent Application No. 63/153,501, filed Feb. 25, 2021, the disclosure of which is incorporated by reference herein in its entirety.

TECHNICAL FIELD

The following description relates to locking mechanisms, and more particularly, to a locking mechanism for a steering column assembly.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions to provide flexibility in the location of the hand wheel and facilitate more comfortable driving positions for different sizes of drivers or autonomous driving capability. Many axially adjustable steering columns further include rake actuators that permit tilt movement around one or more pivot points. Telescopic steering columns with both rake and axial movement can require a large amount of space to operate in the underlying structure.

In addition to providing adjustability, axially adjustable steering column assemblies may also include a collapsible functionality that provides safety advantages during an energy absorption event. A locking mechanism is oftentimes required to maintain a moveable portion of the steering column assembly at a desired position after axial adjustment. One type of commonly used locking mechanism in the automotive industry is called a telescoping positive lock mechanism. When designing a telescoping positive lock mechanism, attention must be taken to allow for proper column locked and unlocked conditions. The unlocked condition must ensure for the allowance of full telescopic/axial range of adjustment. When the steering column assembly is locked, the steering column assembly must maintain a fixed telescopic/axial position while under normal vehicle operating conditions. However, during a collapse event various measures may be implemented to ensure a required collapse condition and/or range of motion while within a range applied load.

Accordingly, there is a continuing need to improve the operational framework of locking mechanisms to improve upon packaging, load requirements, and dependability.

SUMMARY

According to one aspect of the disclosure, a locking mechanism for an axially adjustable steering column includes a lock cam including a cam portion and a hub portion, wherein the cam portion and the hub portion are independent, separately formed components. The locking mechanism also includes a pin extending through the cam portion to permit the cam portion to pivot. The locking mechanism further includes a toothed portion formed on the cam portion for pivoting into engagement with teeth associated with the axially adjustable steering column in a locked position and out of engagement with the teeth in an unlocked position. The locking mechanism yet further includes an interface surface on the hub portion that includes at least one angled surface that interfaces with an adjustable lever and biases the cam portion from the locked position to the unlocked position.

According to another aspect of the disclosure, an axially adjustable steering column assembly includes a first jacket and a second jacket, the second jacket axially moveable relative to the first jacket. The steering column assembly also includes an adjustable lever pivotable between a locked position and an unlocked position, the adjustable lever including a tab. The steering column assembly further includes a locking mechanism located between the first jacket and the second jacket. The locking mechanism includes a cam portion including a toothed portion for pivoting into engagement with teeth associated with the first jacket in the locked position and out of engagement with the teeth in the unlocked position. The locking mechanism also includes a hub portion defining an interface surface that includes at least one angled surface that interfaces with the tab and pushes the cam portion from the locked position to the unlocked position.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 10 generally illustrates a side view of the locking mechanism in accordance with the second embodiment of the disclosure.

FIG. 11 is a side view of the locking mechanism according to another aspect of the disclosure.

DETAILED DESCRIPTION

Figure 1:
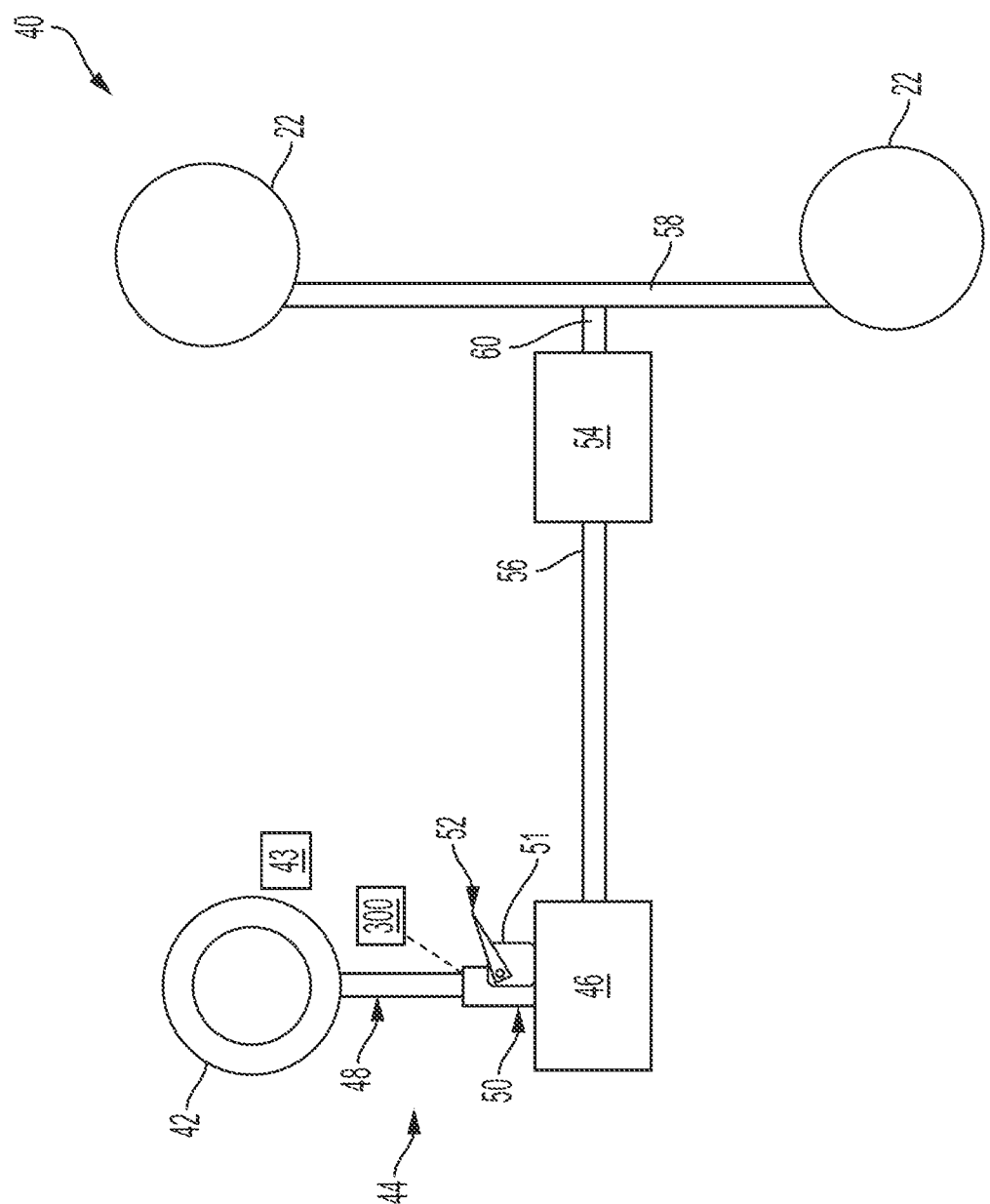
FIG. 1 generally illustrates a steering system including an adjustable steering column assembly according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions to provide flexibility in the location of the hand wheel and facilitate more comfortable driving positions for different sizes of drivers or autonomous driving capability. Many axially adjustable steering columns further include rake actuators that permit tilt movement around one or more pivot points. Telescopic steering columns with both rake and axial movement can require a large amount of space to operate in the underlying structure.

In addition to providing adjustability, axially adjustable steering column assemblies may also include a collapsible functionality that provides safety advantages during an energy absorption event. A locking mechanism is oftentimes required to maintain a moveable portion of the steering column assembly at a desired position after axial adjustment. One type of commonly used locking mechanism in the automotive industry is called a telescoping positive lock mechanism. When designing a telescoping positive lock mechanism, attention must be taken to allow for proper column locked and unlocked conditions. The unlocked condition must ensure for the allowance of full telescopic/axial range of adjustment. When the steering column assembly is locked, the steering column assembly must maintain a fixed telescopic/axial position while under normal vehicle operating conditions. However, during a collapse event various measures may be implemented to ensure a required collapse condition and/or range of motion while within a range applied load.

Referring now to the drawings, where the various embodiments are shown and described herein, without limiting same, FIGS. 1-11 illustrate embodiments of a steering column assembly that is axially adjustable and includes a locking mechanism with improved dependability and other operational benefits. The axial adjustability can result from relative movement between two or more jackets that permit axial movement therebetween. For example, a first jacket and a second jacket move in a relative telescopic, sliding, or translational configuration.

Referring initially to FIG. 1, a steering system 40 for a vehicle is generally illustrated according to the principles of the present disclosure. The vehicle may include any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as planes, boats, trains, drones, or other suitable vehicles.

The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. An airbag device 43 may be located on or near the input device 42. A steering column assembly 44 extends along an axis from the input device 42 to an output assembly 46. The output assembly 46 may include a pinion shaft assembly, an I-shaft, a cardan joint, steer-by-wire components or any other features conventionally located opposite the input device 42. The steering column assembly 44 may include at least two axially adjustable parts, for example, a first jacket 48 and a second jacket 50 that are axially adjustable with respect to one another. The first jacket 48 and the second jacket 50 may be alternatively configured as brackets, rails, or other members that permit axial movement therebetween. The axial movement may include sliding, telescopic, translating, and other axial movements. The steering column assembly 44 may include a bracket 51 that at least partially connects the steering column to the vehicle 10. An adjustable lever 52 may be operably connected to one of the first jacket 48, the second jacket 50, or the bracket 51 to facilitate axial or tilting adjustment of the steering column assembly 44. In some embodiments, behavior of the adjustable lever 52 may be controlled via a control system 300 including a CPU unit. In some embodiments, behavior of the adjustable lever 52 may be controlled manually.

The steering column assembly 44 is moveable between a range of positions from an extended position to a retracted position. In the extended position, the first jacket 48 and second jacket 50 are moved axially away from each other so that the input device 42 is located near an operator of the vehicle. In the retracted position, the first jacket 48 and second jacket 50 are moved axially towards each other so that the input device 42 is located away from an operator of the vehicle. In some embodiments, the retracted position may correspond to stowing the input device 42. For example, it may be beneficial to place the input device 42 in a stowed location during autonomous driving. In some embodiments, the retracted position can be on the order of about 150 mm away from the extended position, such as at least 100 mm, or at least about 125 mm away from the extended position. In some embodiments, the adjustable lever 52 effectuates axial movement between the first jacket 48 and second jacket 50 to adjustment between the extended position and the retracted position. In some embodiments, the adjustable lever 52 effectuates rake or tilt movement of the steering column assembly 44.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axel to turn the wheels 22.

Figure 2:
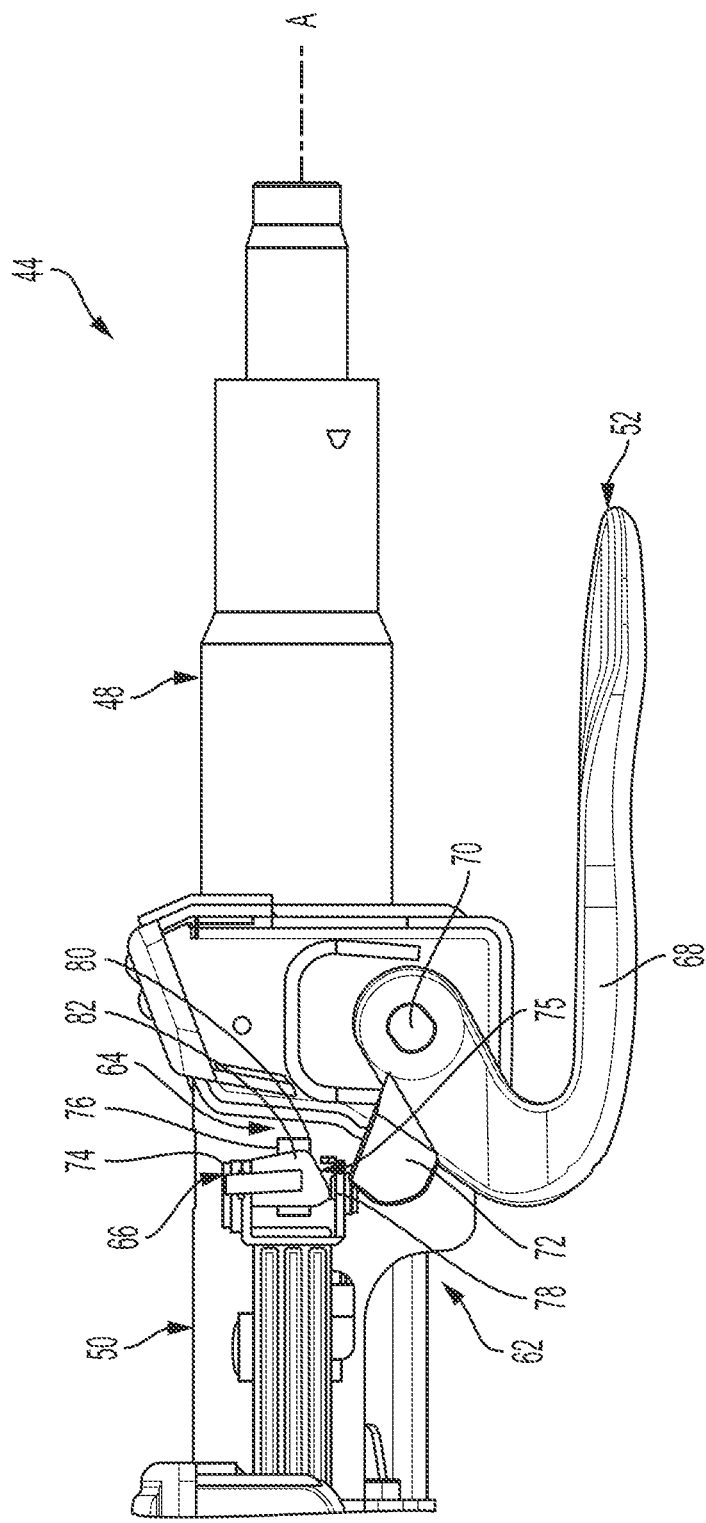
FIG. 2 generally illustrates a side view of the adjustable steering column assembly with an adjustment lever and a locking mechanism in a locked position.

FIG. 2 generally illustrates a side view of the adjustable steering column assembly 44 with the adjustment lever 52 and a locking mechanism 62 in a locked position. The locking mechanism includes an energy absorbing strap 64 and a lock cam 66 that are engaged in the locked position and spaced in the unlocked position. The adjustable lever 52 includes a handle portion 68 that may include a U-shape and extends from a pivot end to a connection end that is connected to one of the jackets 48, 50 (e.g. the second jacket 50) with a pin 70. The pin 70 may connect the adjustable lever 52 to the bracket 51. The adjustable lever 52 includes a tab 72 located between the pivot end and the connection end and is spaced adjacently to the lock cam 66. In operation, as the adjustable lever 52 is rotated from a locked position (FIG. 2), wherein the steering column assembly 44 cannot be adjusted, to an unlocked position (FIG. 3), wherein the steering column assembly can be adjusted, the tab 72 contacts the lock cam 66 and pushes the lock cam 66 out of engagement with the energy absorbing strap 64. As such, the adjustable lever 52 does not directly interface with the energy absorbing strap 64, but instead locks and unlocks the steering column assembly 44 with the lock cam 66, which is a separate component. In the unlocked position, movement of the steering column assembly 44 may be completed inhibited. The steering column assembly 44 may extend along an axis A.

Figure 3:
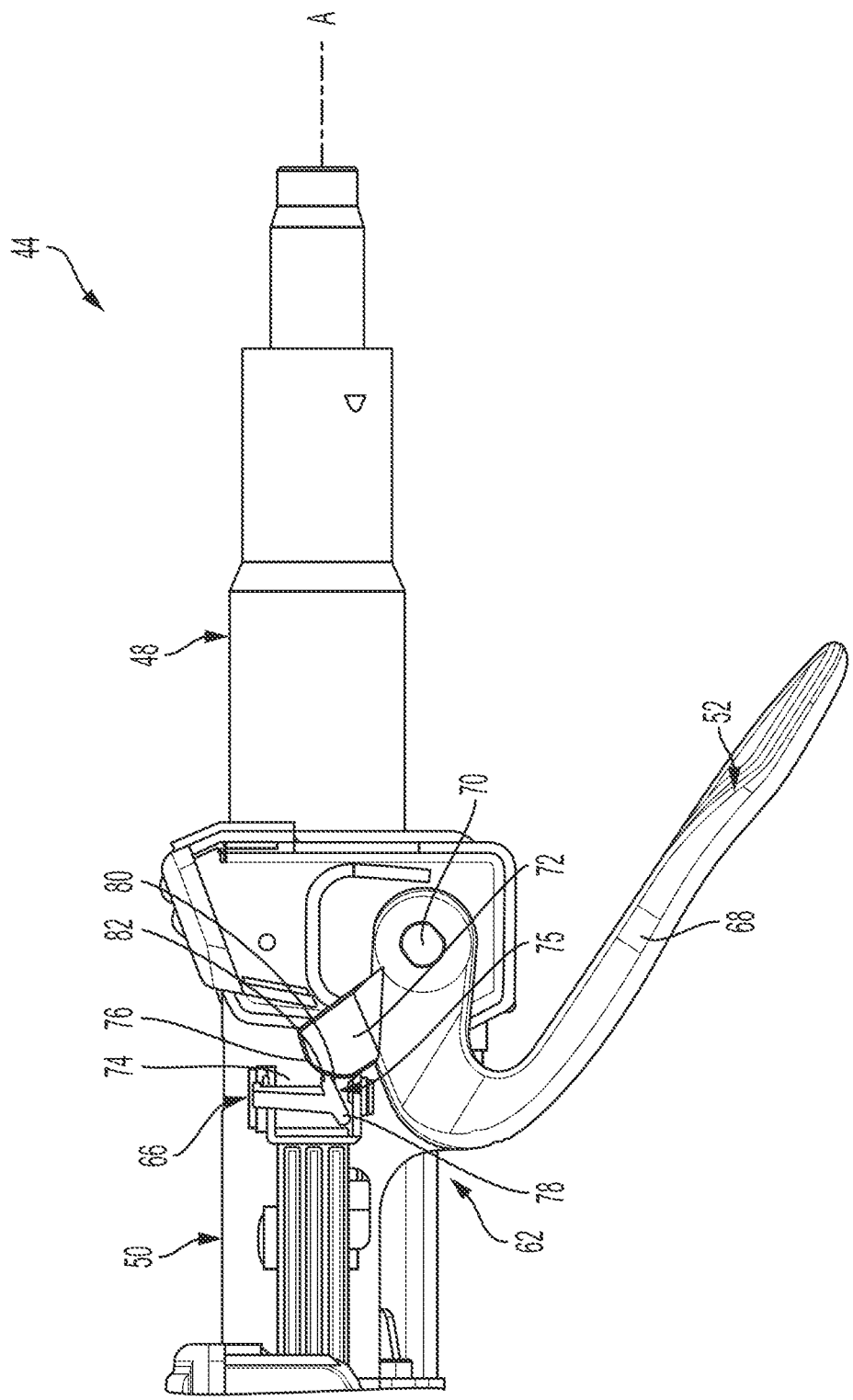
FIG. 3 generally illustrates a side view of the adjustable steering column assembly with the adjustment lever and the locking mechanism in an unlocked position.

FIG. 3 generally illustrates a side view of the adjustable steering column assembly 44 with the adjustment lever 52 and the locking mechanism 62 in an unlocked position such that the tab 72 is pivoted to a position that it is not pressing the lock cam 66 into the energy absorbing strap 64. In the unlocked position, the steering column assembly 44 may be expanded and retracted.

Figure 4:
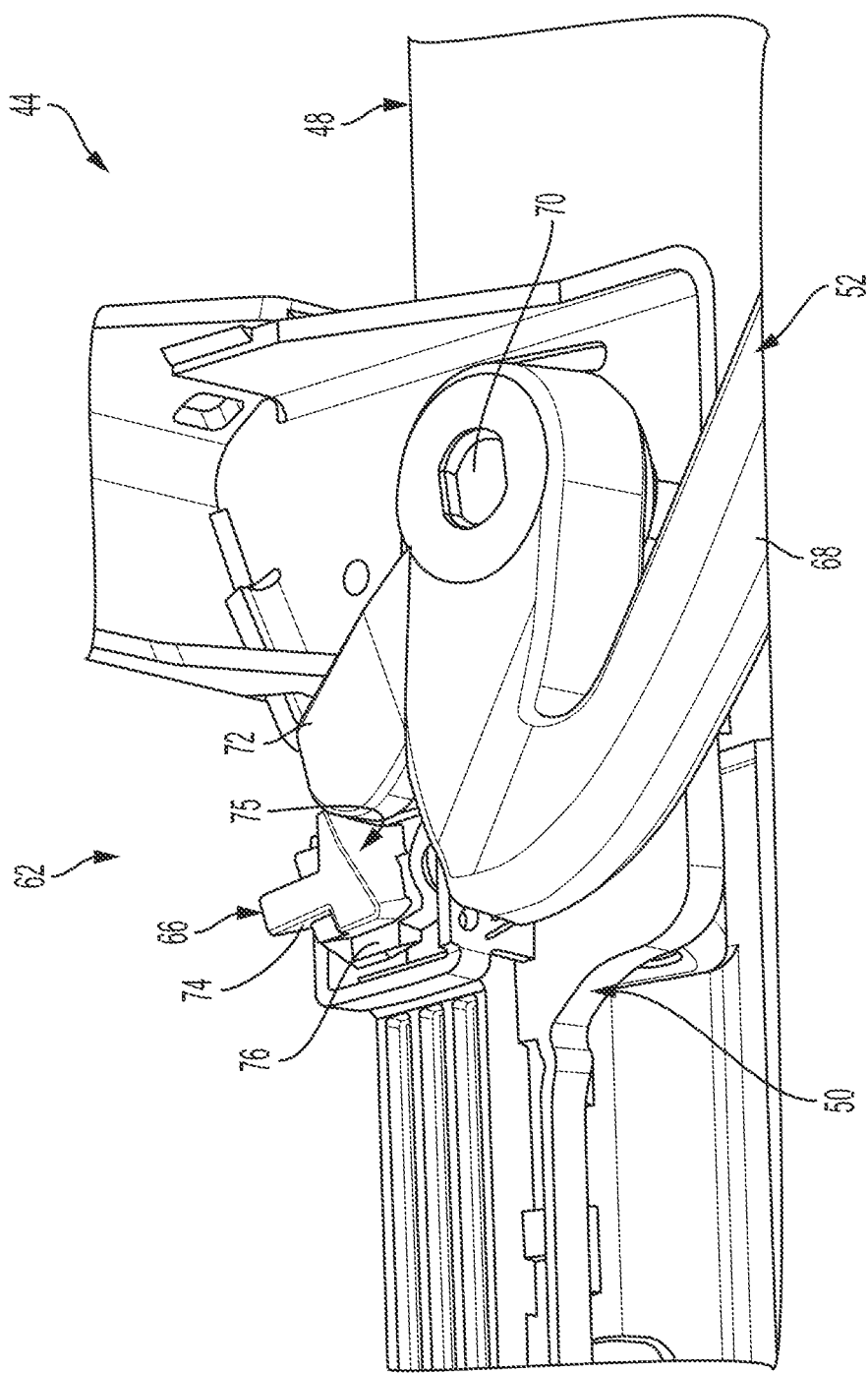
FIG. 4 generally illustrates an enlarged perspective view of the adjustment lever and the locking mechanism in the unlocked position.

FIG. 4 generally illustrates the adjustment lever 52 and the locking mechanism 62 in greater detail. The steering column assembly 44 is shown in the unlocked position. The lock cam 66 includes a hub portion 74 and a cam portion 76. It is to be understood that the hub portion 74 and the cam portion 76 are separate components. The hub portion 74 connects to an outer surface of the cam portion 76 or may be integral therewith. The hub portion 74 includes an interface surface 75 that is geometrically shaped and positioned to be pushed into and out of engagement with the tab 72. More particularly, the interface surface 75 may include a first angled surface 78 that extends to an apex 80 (FIGS. 2 and 3) and a second angled surface 82 (FIGS. 2 and 3) extending from the apex 80. The apex 80 may be triangularly shaped or rounded. The first angled surface 78 and the second angled surface 82 may be on different planes. In operation, the tab 72 may be spaced from the first angled surface 78 in the locked position (FIG. 2) and may pivot into contact with the first angled surface 78 as adjustable lever 72 is actuated (FIG. 3). As the tab 72 contacts the first angled surface 78, the lock cam 66 is pivoted away from the energy absorbing strap 64. In some embodiments, when the adjustable lever 52 is pivoted to the unlocked position, the tab 72 extends on or adjacent to the apex 80.

Figure 5:
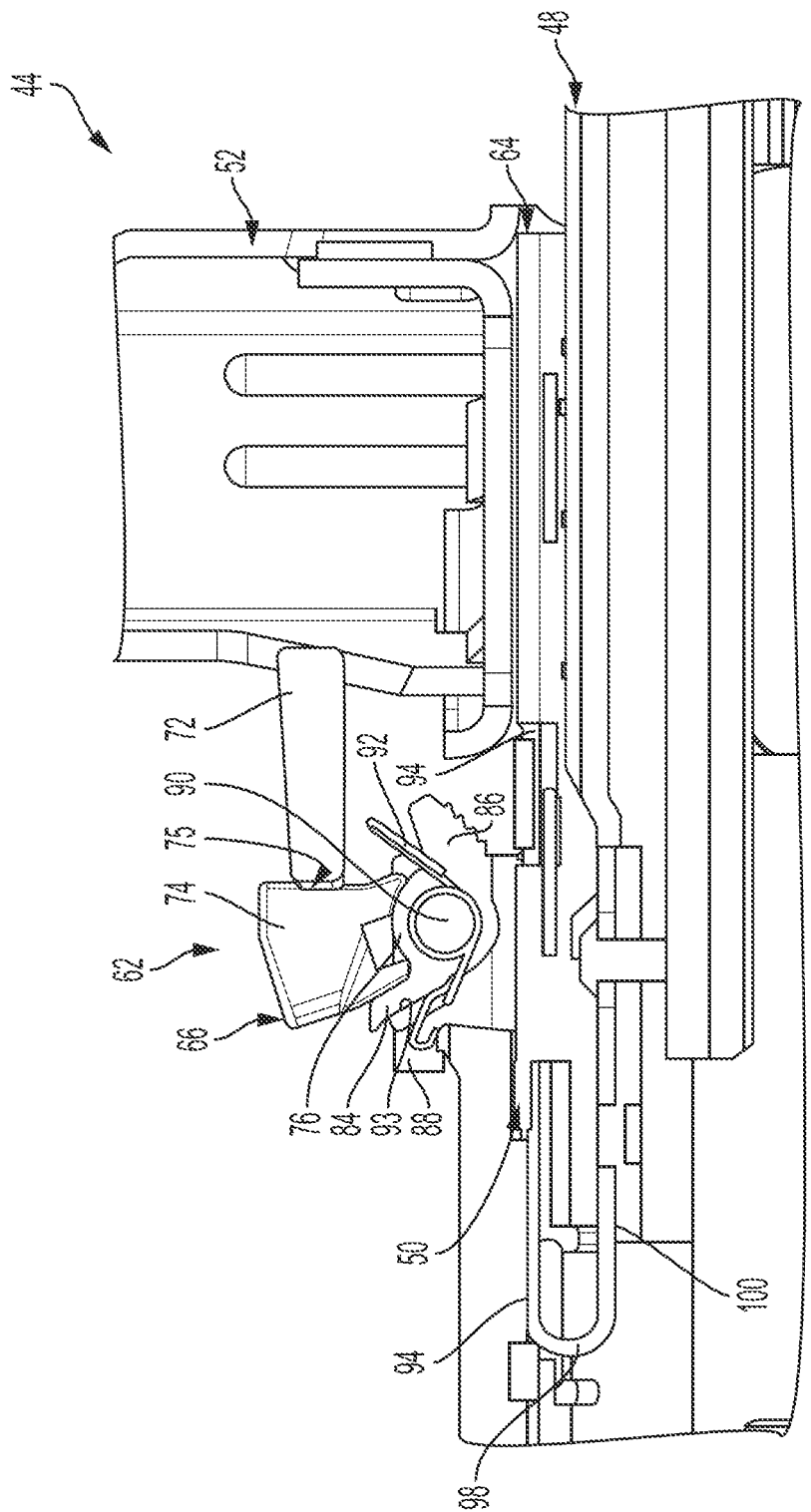
FIG. 5 generally illustrates a sectional bottom view of the adjustment lever and the locking mechanism in the unlocked position.

FIG. 5 generally illustrates a sectional bottom view of the adjustment lever 52 and the locking mechanism 62 in the unlocked position. The cam portion 76 includes a tail 84 and a toothed portion 86. The cam portion 76 is operatively connected to a cam bracket 88 with a pin 90 that is located between the tail 84 and the toothed portion 86. The lock cam 66 is biased in the locked position by a torsion spring 92 that extends about the pin 90 and presses the tail 84 away from the axis. In particular, the cam portion 76 defines an aperture that the pin 90 extends through and the hub portion 74 also defines an aperture that the pin 90 extends through. Therefore, the hub portion 74 and the cam portion 76 are each pivotable about the pin 90, i.e., the same axis. One end of the torsion spring 92 attaches to a strap cover 99 which is permanently fixed to the lower jacket 50. The torsion spring 92 wraps around the pin 90 and pushes down on the toothed portion 86 of the cam portion 76, thus pushing the toothed portion 86 towards the axis A and into engagement with the teeth 96 on the energy absorbing strap 64. The hub portion 74 may include a recess 93 for locating the tail 84. The energy absorbing strap 64 may include a first straight portion 94 defining a series of teeth 96 that are intermeshed with the tooth portion 86 in the locked position. The energy absorbing strap 64 may further include a curved portion 98 that enters into an opening of the second jacket 50 to a second straight portion 100 that connects to the first jacket 48. During an impact event, the energy absorbing strap 64 dissipates at least some of the kinetic energy of collapsing first jacket 48 and the second jacket 50 via relative pulling of the first straight portion 94 and the second straight portion 100 and consequential rolling of the curved portion 98. In some embodiments, the teeth 96 may be located directly on the first jacket 48 or other components connected therewith.

Figure 6:
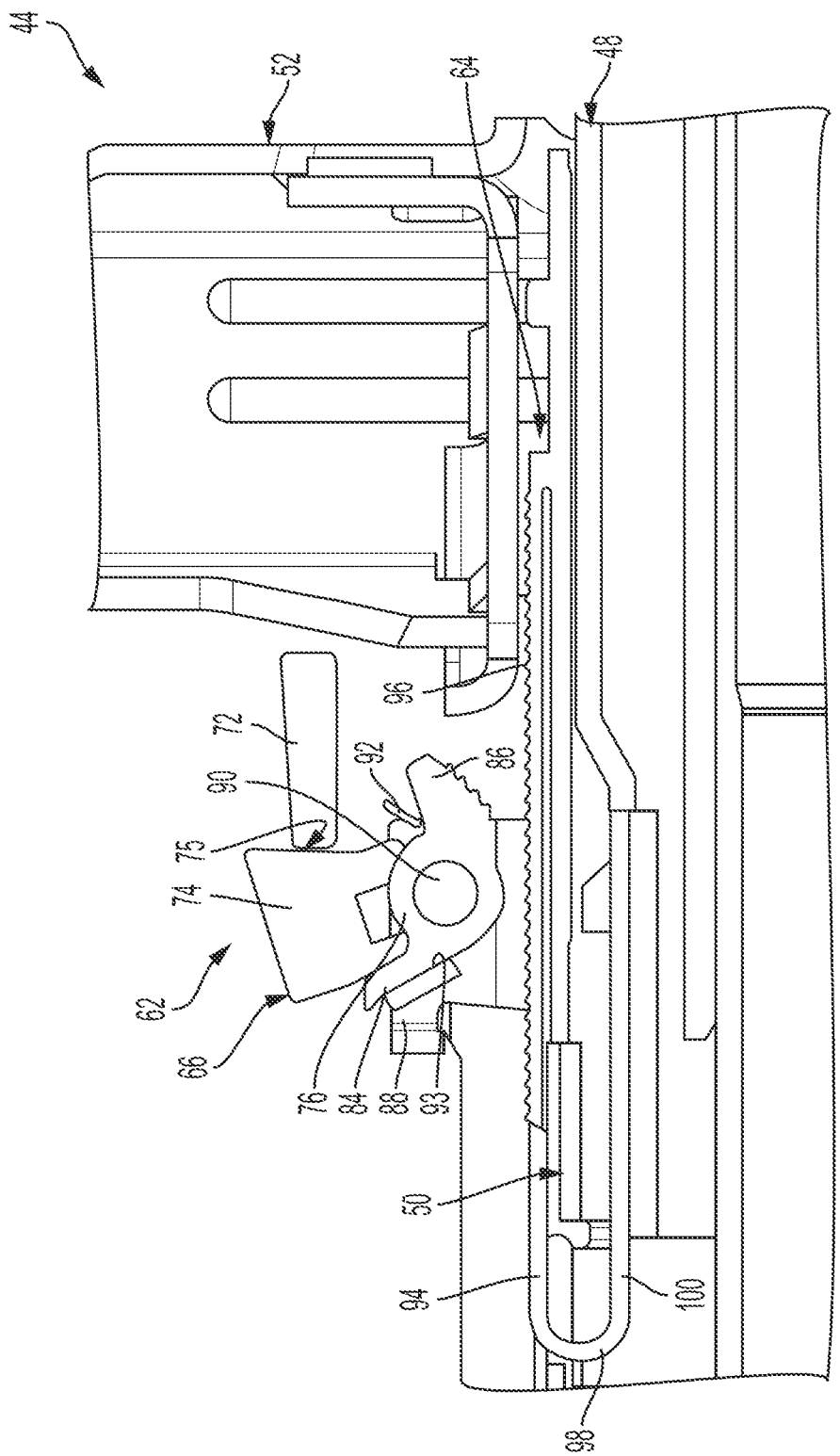
FIG. 6 generally illustrates a sectional bottom view of the adjustment lever and the locking mechanism including an energy absorbing strap and a lock cam in the unlocked position such that the lock cam is spaced from the energy absorbing strap.

FIG. 6 generally illustrates a sectional bottom view of the adjustment lever 52 and the locking mechanism 62 including the energy absorbing strap 64 and a lock cam 66 in the unlocked position such that the lock cam 66 is spaced from the energy absorbing strap 64.

Figure 7:
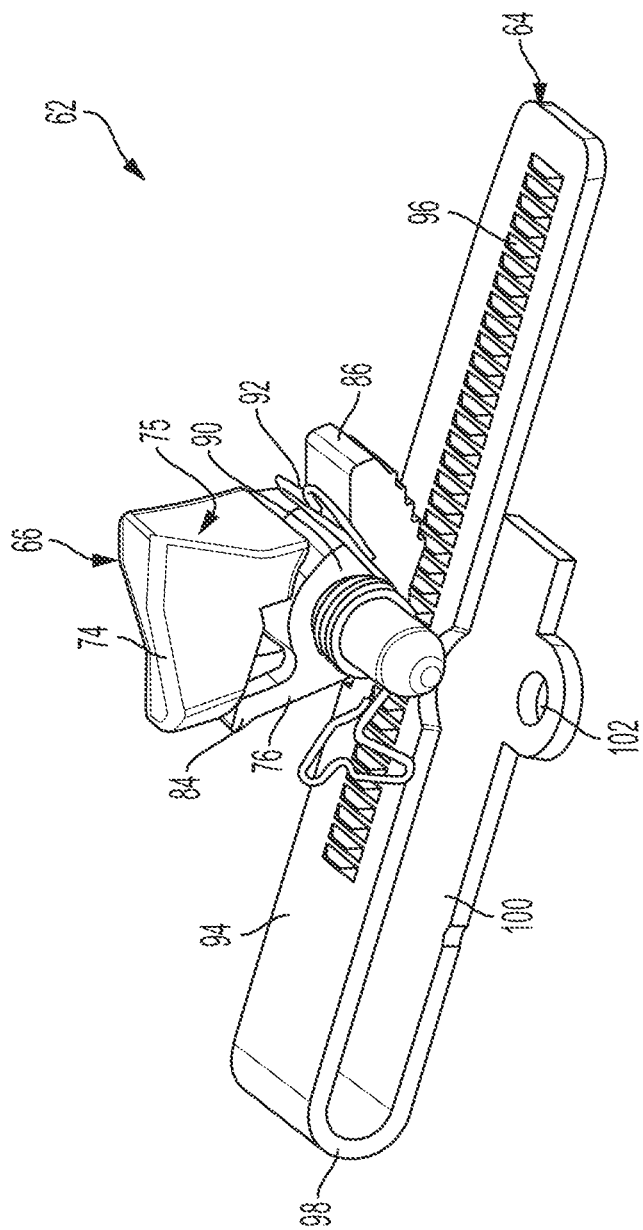
FIG. 7 generally illustrates a perspective view of the locking mechanism isolated from the steering column assembly.
Figure 8:
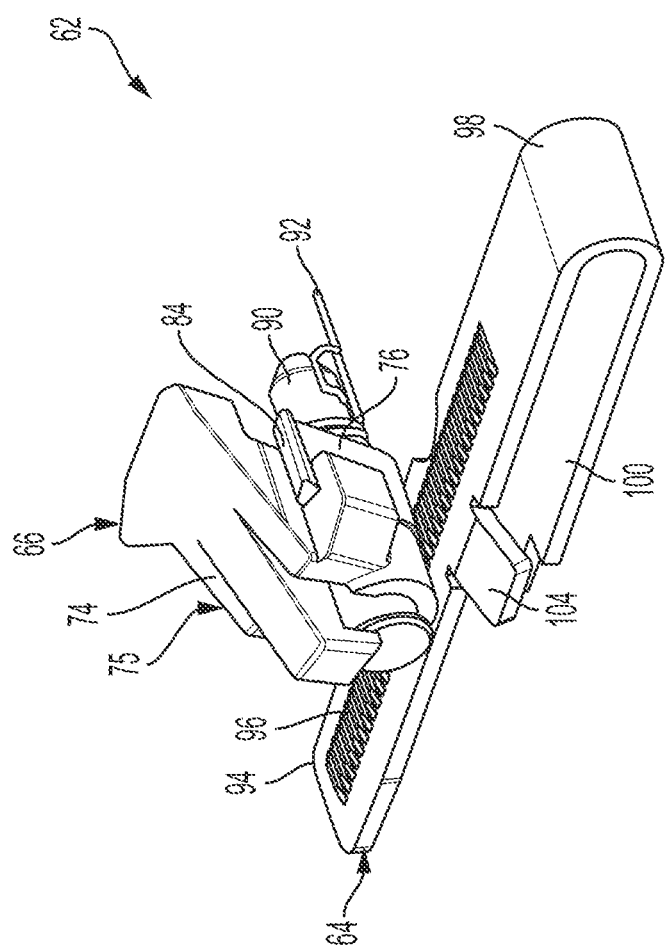
FIG. 8 generally illustrates a perspective view that is opposite from FIG. 7 and is of the locking mechanism isolated from the steering column assembly.

FIG. 7 generally illustrates a perspective view of the locking mechanism 62 isolated from the steering column assembly 44. The energy absorbing strap 64 may include an aperture 102 for facilitating connection to the first jacket 48. FIG. 8 generally illustrates a perspective view that is opposite from FIG. 7 and is of the locking mechanism 62 isolated from the steering column assembly 44. The energy absorbing strap 64 may include a strap tab 104 for facilitating connection to the second jacket 50.

Figure 9:
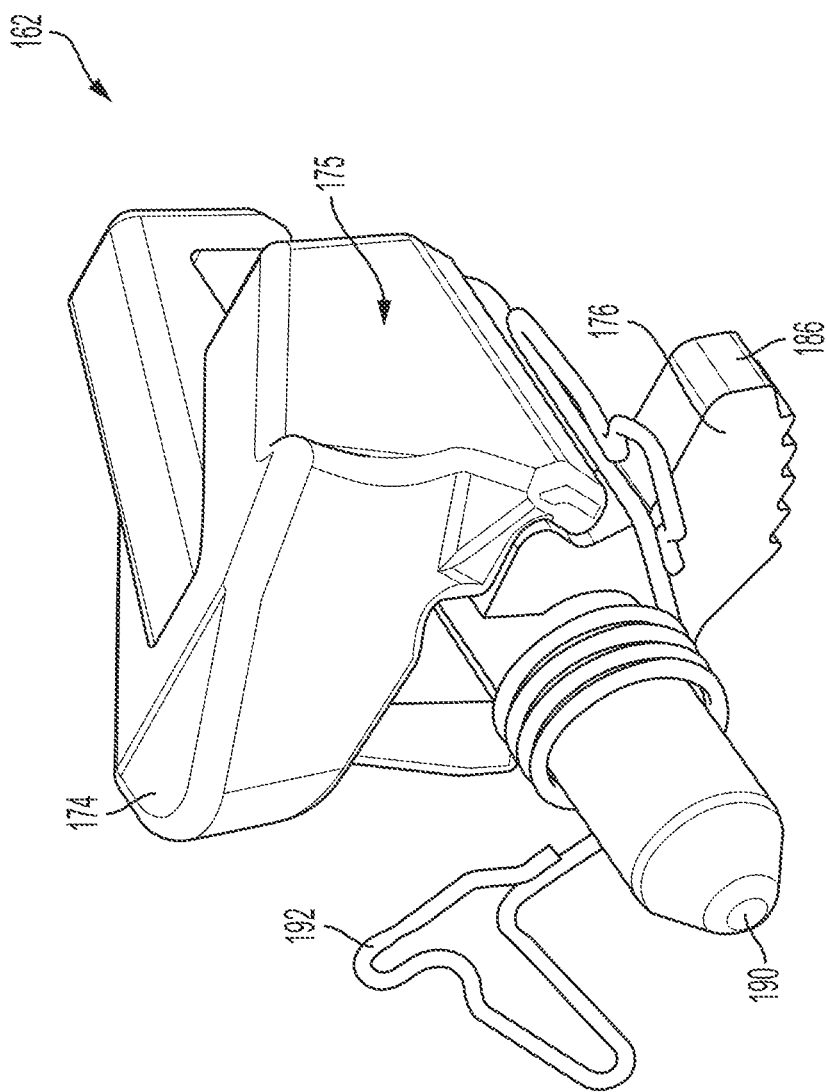
FIG. 9 generally illustrates a perspective view of a locking mechanism in accordance with a second embodiment of the disclosure.

FIG. 9 generally illustrates a perspective view of a locking mechanism 162 in accordance with a second embodiment of the disclosure. Unless otherwise indicated, the second embodiment may share all of the same features, elements, and functionalities of the first embodiment. Similar elements are numbered under the same convention as the first embodiment with a number "1" placed before. The locking mechanism 162 is similar to the first embodiment, however includes a modified hub portion 174 and cam portion 176. More particularly, the cam portion 176 includes a smaller tail portion 184 (FIG. 10). In some embodiments a spring 192 directly biases the toothed portion 176 towards an energy absorption strap. The hub portion 174 further defines an insertion recess 193 for placement of the cam portion 176 therein. The cam portion 176 may friction fit into the insertion recess 193 and be connected thereto via welding or other methodologies. In some embodiments, the cam portion 176 is formed via stamping before connection to the hub portion 174. FIG. 10 generally illustrates a side view of the locking mechanism 162 in accordance with the second embodiment of the disclosure.

FIG. 11 generally illustrates a side view of a locking mechanism 262 in accordance with a third embodiment of the disclosure. Unless otherwise indicated, the third embodiment may share all of the same features, elements, and functionalities of the first and second embodiments. Similar elements are numbered under the same convention as the previous embodiments with a number "2" placed before. The locking mechanism 262 is similar to the above-described embodiments, however includes a modified hub portion 274 and cam portion 276. More particularly, the cam portion 276 includes a smaller tail portion 284 that is disposed within a cavity 270 of the hub portion 274. Additionally, the cam portion 276 includes a tab 275 also disposed within a recess 277 of the hub portion 274. As with the prior embodiments, the toothed portion 276 is biased towards the energy absorption strap 264.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A locking mechanism for an axially adjustable steering column comprising:
   a lock cam including a cam portion and a hub portion, wherein the cam portion and the hub portion are independent, separately formed components;
   a pin extending through the cam portion to permit the cam portion to pivot;
   a toothed portion formed on the cam portion for pivoting into engagement with teeth associated with the axially adjustable steering column in a locked position and out of engagement with the teeth in an unlocked position; and
   an interface surface on the hub portion that includes at least one angled surface that interfaces with an adjustable lever and biases the cam portion from the locked position to the unlocked position.

2. The locking mechanism of claim 1, wherein the teeth associated with the axially adjustable steering column includes teeth located on an energy absorption strap operatively coupled to the axially adjustable steering column.

3. The locking mechanism of claim 1, wherein the pin extends through the hub portion to permit the hub portion to pivot.

4. The locking mechanism of claim 1, further comprising a biasing member in contact with the cam portion to rotatably bias the cam portion into the locked position.

5. The locking mechanism of claim 4, wherein the biasing member comprises a torsion spring.

6. The locking mechanism of claim 5, wherein the torsion spring at least partially surrounds the pin.

7. The locking mechanism of claim 4, wherein the cam portion includes a tail portion in contact with a leg of the hub portion, wherein rotation of the hub portion biases the cam portion with the leg toward the unlocked position by overcoming a biasing force by the biasing member.

8. The locking mechanism of claim 7, wherein the tail portion is disposed within a recess defined by the hub portion.

9. The locking mechanism of claim 4, wherein the biasing member is fixed at an end of the biasing member to an energy absorbing strap cover.

10. An axially adjustable steering column assembly comprising:
    a first jacket and a second jacket, the second jacket axially moveable relative to the first jacket;
    an adjustable lever pivotable between a locked position and an unlocked position, the adjustable lever including a tab;
    a locking mechanism located between the first jacket and the second jacket, the locking mechanism comprising:
       a cam portion including a toothed portion for pivoting into engagement with teeth associated with the first jacket in the locked position and out of engagement with the teeth in the unlocked position; and
       a hub portion defining an interface surface that includes at least one angled surface that interfaces with the tab and pushes the cam portion from the locked position to the unlocked position.

11. The axially adjustable steering column assembly of claim 10, wherein the teeth associated with the axially adjustable steering column includes teeth located on an energy absorption strap operatively coupled to the axially adjustable steering column.

12. The axially adjustable steering column assembly of claim 10, wherein the cam portion and the hub portion are independent, separately formed components.

13. The axially adjustable steering column assembly of claim 10, wherein the pin extends through the hub portion to permit the hub portion to pivot.

14. The axially adjustable steering column assembly of claim 10, further comprising a biasing member in contact with the cam portion to rotatably bias the cam portion into the locked position.

15. The axially adjustable steering column assembly of claim 14, wherein the biasing member comprises a torsion spring.

16. The axially adjustable steering column assembly of claim 15, wherein the torsion spring at least partially surrounds the pin.

17. The axially adjustable steering column assembly of claim 14, wherein the cam portion includes a tail portion in contact with a leg of the hub portion, wherein rotation of the hub portion biases the cam portion with the leg toward the unlocked position by overcoming a biasing force by the biasing member.

18. The axially adjustable steering column assembly of claim 17, wherein the tail portion is disposed within a recess defined by the hub portion.

19. The axially adjustable steering column assembly of claim 14, wherein the biasing member is fixed at an end of the biasing member to an energy absorbing strap cover.

* * * * *